J. L. SUTTON.

Steam Stove.

No. 640.

Reissued Dec. 28, 1858.

Witnesses

Bowyer Brooke

A Stephens

Inventor

J. L. Sutton

N. PETERS, Photo-Lithographer, Washington, D. C

UNITED STATES PATENT OFFICE.

J. L. SUTTON, OF NORRISTOWN, PA., ASSIGNOR TO HUGH DOWNING.

STEAM-STOVE.

Specification forming part of Letters Patent No. 20,963, dated July 20, 1858; Reissue No. 640, dated December 28, 1858.

*To all whom it may concern:*

Be it known that I, J. L. SUTTON, of Norristown, Montgomery county, State of Pennsylvania, have invented a new and Improved Steam Heating Apparatus; and I do hereby declare the following to be a full, clear, and exact description of the same, reference being had to the accompanying drawings, and to the letters of reference marked thereon.

My invention consists in combining two or more concentric steam-chambers, connected together and arranged in respect to each other substantially as described hereinafter, with a boiler attached to any ordinary stove, for the purpose of obtaining an extensive area of heating-surface, and of imparting a uniform and wholesome heat at the expense of a small amount of fuel.

In order to enable others to make and use my invention, I will now proceed to describe its construction and operation.

Figure 1:
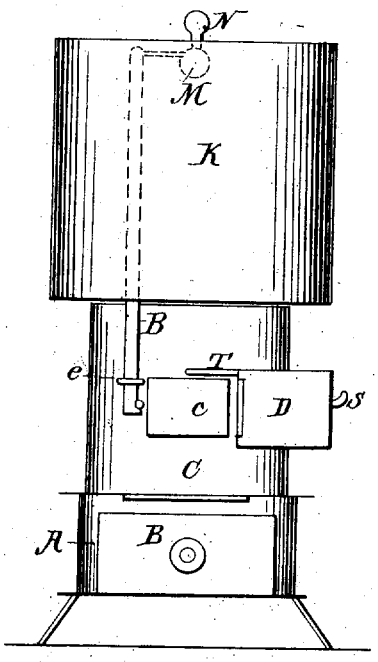
Figure 3:
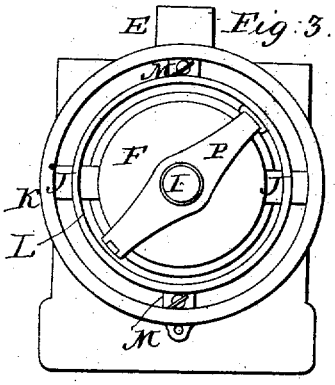
Figure 2:
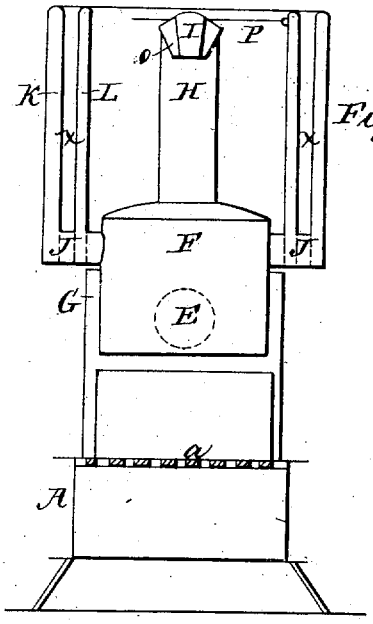

On reference to the accompanying drawings, which form a part of this specification, Figure 1 is a front elevation; Fig. 2, a plan or top view; and Fig. 3, a sectional elevation on the line 1 2, Fig. 2.

Similar letters refer to similar parts throughout the several views.

A is the base of a stove, supported on legs in the usual manner, and having the ordinary ash-pit drawer, B, and grate *a*.

C is the exterior casing of the stove, secured to the base A, and having an opening, *c*, in front for the reception of fuel, and another opening, E, at the rear for the escape of the products of combustion to the chimney. The inside of the casing A, immediately in the neighborhood of the fire, may be lined with fire-clay, as usual.

F is a boiler attached to the top of the casing *c* in any convenient manner, the lower portion of the boiler projecting downward within the casing, so as to be exposed to the action of the fire.

H is a pipe projecting from the top, and communicating with the interior of the boiler. The top of this pipe is furnished with a valve, *o*, having a central plug, I, the removal of which leaves an opening in the valve through which the boiler can be replenished with water.

K and L are two cylindrical concentric chambers connected together by and communicating with each other through passages J, situated at the lower ends, there being an uninterrupted space, *x*, between them for the free passage of air. These chambers, which may be made of thin metal plates, may either be situated in close proximity to the stove, as illustrated in the drawings, or they may be situated at such a distance from the stove as the nature of the room or building to the heating of which my improvement is applied may suggest as the most suitable. A free communication, however, must exist between the upper end of the boiler F and the lower end of the concentric chambers. In the present instance this communication is effected by continuations of the passages J. The upper ends of the concentric chambers are connected together by passages M, and through these passages are openings furnished with plugs N, which may be removed and replaced when required.

To any permanent part of either the stove or the concentric chambers is hinged the lever P, which rests on and is so adapted to the safety-valve *o* that the plug I may be removed or replaced without disturbing this lever. To the end of the latter is connected a rod, R, which extends down the front of the stove and is guided in a staple, *e*, the rod terminating at the latch S of the door, and the rod and latch being so arranged that when the rod is raised the latch will be relieved from its catch, and the door, by the action of the spring T, thrown open.

By the close contiguity of the boiler to the fire steam is rapidly generated, and fills the concentric chambers K and L, the plugs N being, in the first instance, temporarily removed, in order to allow for the escape of air. A uniform heat is thus imparted to the plates which form the concentric chambers K and L, and the air in the apartment, passing through the space surrounded by the inner concentric chamber, through the annular space *x* between the two chambers, and in contact with the outer surface of the exterior chamber, has a corresponding uniform heat imparted to it before it passes off to be disseminated throughout the apartment. Should the steam gain too great a pressure, the valve *o* rises and allows a portion to escape. At the same time the latch of the door D is released by the rising of the rod R, the door thrown open, the heat consequently reduced, and the pressure of the steam lessened.

It will be seen, without further description, that the above-described arrangement of concentric chambers, although occupying but little space, presents an extended area of heating-surface, furnishing a supply of that uniform and wholesome heated air which cannot be obtained by ordinary radiating-stoves, in which a larger amount of fuel is consumed to obtain but a portion of the heat imparted by my improvement. At the same time the simplicity in the construction of my heating apparatus is such as to render it inexpensive and within the reach of all classes.

The number of concentric chambers need not be limited to two, as three or more may be used to advantage. Their capacity and number, in fact, should be regulated by the capacity of the boiler and the amount of heat required. Neither is it necessary to place a system of connected concentric chambers in close proximity to the stove and boiler, as in many instances it may prove of advantage to place them a distance a part, and even in separate apartments.

I claim—

Combining two or more concentric steam-chambers, connected together and arranged in respect to each other substantially as herein set forth, with a boiler attached to any ordinary stove, for the purpose specified.

In testimony whereof I have signed my name to this specification in the presence of two subscribing witnesses.

J. L. SUTTON.

Witnesses:
HENRY HOWSON,
HENRY ODIORNE.